United States Patent [19]
Wehr

[11] Patent Number: 4,593,556
[45] Date of Patent: Jun. 10, 1986

[54] TESTER FOR LOCK UP TORQUE CONVERTERS

[76] Inventor: James R. Wehr, 3534 Cara La., Springfield, Mo. 65802

[21] Appl. No.: 671,438

[22] Filed: Nov. 14, 1984

[51] Int. Cl.$^4$ .......................................... G01M 19/00
[52] U.S. Cl. .................................................... 73/118
[58] Field of Search ...................... 73/116, 117.3, 118, 73/168

[56] References Cited

U.S. PATENT DOCUMENTS

| | | | |
|---|---|---|---|
| 3,016,740 | 1/1962 | Raidl | 73/118 |
| 3,060,730 | 10/1962 | Lucia | 73/118 |
| 3,157,047 | 11/1964 | Urban et al. | 73/118 |
| 3,273,384 | 9/1966 | Flaugher | 73/118 |
| 3,302,107 | 1/1967 | Flaugher et al. | 324/170 |
| 3,482,441 | 12/1969 | Goetchuis et al. | 73/118 |
| 3,505,863 | 4/1970 | Lucia | 73/116 |
| 3,592,053 | 7/1971 | Lucia | 73/66 |
| 3,680,370 | 8/1972 | Muller-Berner | 73/118 |
| 4,356,724 | 11/1982 | Ayoub et al. | 73/118 |
| 4,468,958 | 8/1984 | Takeshita | 73/118 |

FOREIGN PATENT DOCUMENTS

| | | | |
|---|---|---|---|
| 491067 | 4/1974 | U.S.S.R. | 73/118 |

OTHER PUBLICATIONS

Brochure entitled, "New Mark 10R Transaxle Dynadrome and Mark 3R Dynadrome" from Deltadynamics, Inc.
Brochure entitled, "Mark III Dynadrome" from Deltadynamics, Inc.
Brochure entitled, "Inertia Wheel Dynadromes" from Deltadynamics, Inc.

Primary Examiner—Stewart J. Levy
Assistant Examiner—Robert R. Raevis
Attorney, Agent, or Firm—D. A. N. Chase; Michael Yakimo, Jr.

[57] ABSTRACT

A method and performing apparatus for testing the efficacy of the lock-up mechanism for a torque converter on a transmission test machine includes a lock-up switch wired in a manner to simultaneously direct current to the lock-up solenoid of the transmission under test and a digital clock. The current is provided by the associated electrical system of the operating prime mover of the test machine. A simulated axle load on the test machine is braked to preclude rotation of the transmission's output shaft connected thereto. Upon operation of the prime mover, the transmission shifts into high gear and current from the electrical system is directed to the solenoid and clock by closure of the lock-up switch. Upon proper engagement of the lock-up assembly, the direct drive established between the driven and braked output shaft precludes rotation of the drive shaft. This preclusion of rotation shuts down the prime mover and cuts off generation of the current by the associated electrical system. The elapsed time on the deenergized clock indicates the time it takes "lock-up" to occur which is then compared with a predetermined norm indicative of a proper operation of the lock-up mechanism.

5 Claims, 5 Drawing Figures

TESTER FOR LOCK UP TORQUE CONVERTERS

BACKGROUND OF THE INVENTION

This invention relates to a method and apparatus for determining the efficacy of the lock-up mechanism of a torque converter.

Various machines are utilized to test transmissions used in automotive vehicles. These machines enable rebuilt transmissions to be tested apart from the vehicle and under simulated conditions of operation. Basically, the test machine comprises a test stand having thereon a prime mover/engine which powers the transmission under test. The transmission under test drives a simulated load connected to the output shaft of the transmission. Accordingly, the rebuilt transmission is mounted on the test stand, powered by the prime mover and operated as if installed on a vehicle.

Various performance parameters of the tested transmission may then be measured. It is desirable to test whether the power, generated by the prime mover, is being efficiently transmitted to the drive wheel(s)/load of the vehicle. Thus, I have found that the efficacy of the torque converter and the lock-up mechanism therein must be considered.

In normal operation, the torque converter uses oil as the fluid coupling medium to transfer the power of the rotating drive shaft to the input shaft of the transmission. Generally, the converter includes a housing having a first and second series of opposed windmill-like plates or vanes therein. The housing and "pump/driver" vanes are attached to the drive shaft of the engine. The opposed set of "turbine/driven" vanes is attached to the input transmission shaft. As the pump vanes are rotated by the rotating drive shaft there must be a medium to transfer the rotation of the pump vanes to the turbine vanes so as to drive the input shaft.

As there is no direct mechanical connection between the pump and the turbine, the converter housing is filled with oil. As the pump rotates it "flings" oil onto the turbine vanes. The oil being flung onto the turbine causes the turbine to rotate as well as the transmission shaft connected thereto.

A stator member system directs the oil being flung from the rotating turbine back against the turbine. As the redirected oil repeatedly contacts the turbine vanes, the forces on the turbine vanes increase resulting in torque multiplication. Torque multiplication occurs only when the pump is turning considerably faster than the turbine, such as during acceleration of the vehicle.

As the vehicle speed increases, the rotation of the turbine begins to "catch up" with the pump. The force of the oil being flung from the turbine is reduced as the turbine is taking up most of the energy. As there is no need to redirect the oil back onto the turbine, the stator is removed from its "normal" operation.

However, even at high speeds there is still an inherent inefficiency in directing the transfer of the rotation of the pump to the turbine via a fluid coupling medium. Thus, it is advantageous to mechanically couple or "lock-up" the rotation of the turbine to that of the pump side to reduce any "fluid-coupling" slippages and inefficiencies therebetween. A lock-up assembly has been provided to provide this connection. Generally, the lock-up assembly comprises a clutch plate connected to the input shaft of the transmission, a valve-controlled, fluid flow system and lock up solenoid. (It is understood that some lock-up assemblies are activated by non-electrical signals). When computer-like sensors detect a high r.p.m., designating that the car is in a high gear, an electric signal is delivered to the lock up solenoid. The energized solenoid closes a valve in the fluid flow system which allows oil to flow to the apply side of the clutch plate. The fluid pressure moves the plate into a position linking it with the converter housing. As the plate is now linked to the drive shaft, there is a direct drive between rotation of the engine drive shaft and the input shaft of the transmission. This direct connection eliminates any inherent slippage that may occur due to the normal fluid coupling.

Accordingly, my invention presents a method and performing apparatus of measuring the efficacy of the lockup mechanism of a torque converter. More particularly, I provide a method and performing apparatus to determine the time it takes the lock-up assembly to provide the direct-drive connection as measured from the time the assembly receives it lock-up command. This time parameter is then compared with a preestablished time parameter indicative of normal function of the lock-up mechanism.

DESCRIPTION OF PREFERRED EMBODIMENT

Figure 2:
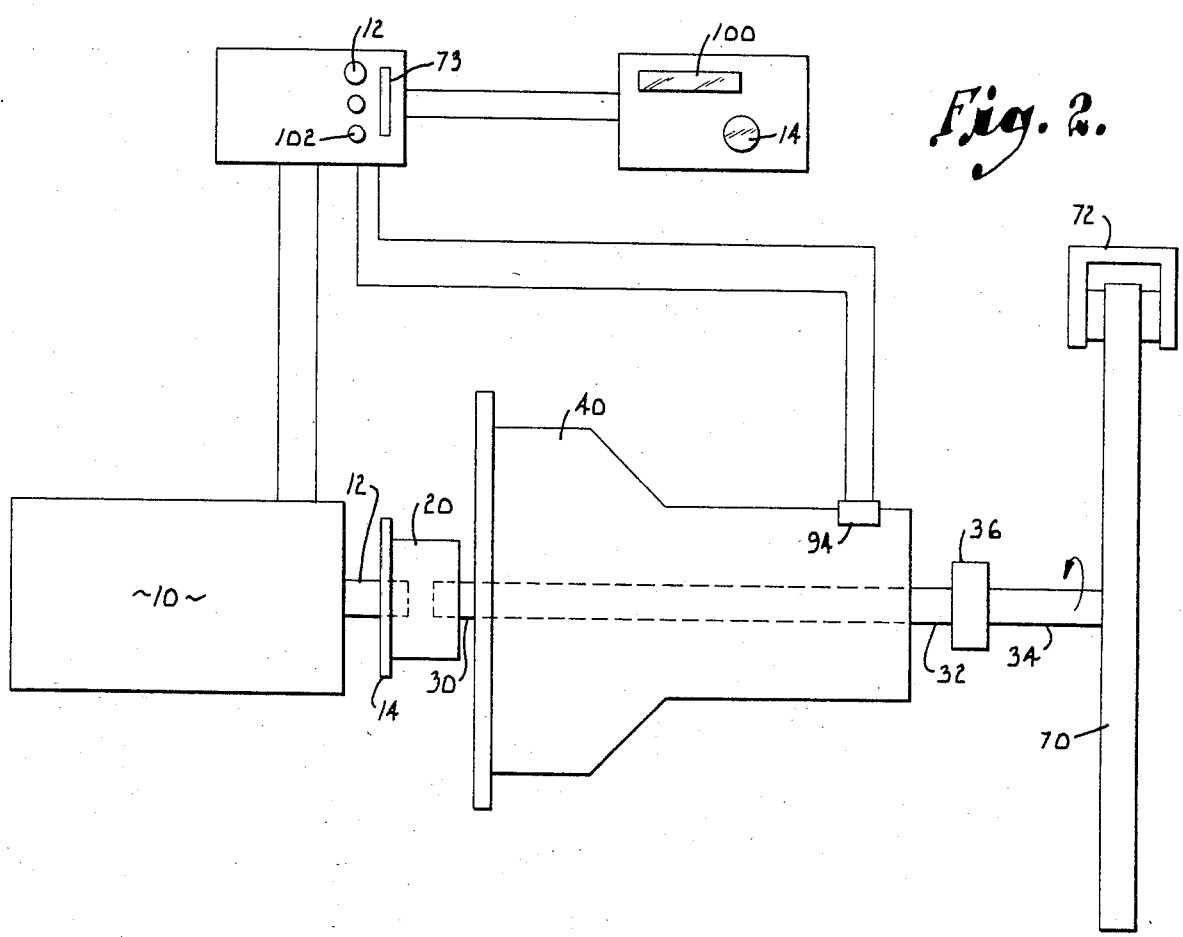
FIG. 2 is a block diagram of a rear wheel transmission test machine with the apparatus for testing the lock-up mechanism being illustrated therein.
Figure 5:
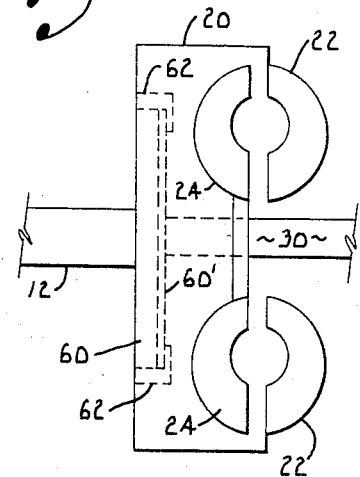
FIG. 5 is a diagrammatic view illustrating the members of a torque converter.

As shown in FIG. 2, a conventional rear wheel transmission testing machine comprises a prime mover 10 in the form of an engine having a drive shaft 12 extending into the torque converter 20. (The housing of the torque converter 20 is normally connected to the drive shaft via the vehicle fly wheel.) As shown, a flex plate 14 provides for this connection. Operably associated with the housing of the converter 20 are the drive shaft and pump vanes 22 as diagrammatically illustrated in FIG. 5. The pump 22 is connected to the shaft 12 with the turbine 24 being attached to the input shaft 30 of the transmission 40 which extends into the torque converter 20 from the opposed side thereof. Thus, the converter housing encloses the pump 22, turbine 24 and the adjacent ends of the drive shaft 12 and input shaft 30. As above discussed, rotation of the drive shaft 12, caused by operation of the prime mover 10, rotates the housing of the converter 20 and pump 22 attached thereto. Upon rotation of the pump 22, oil is flung onto the turbine 24 which rotates the turbine and the input shaft 30 connected thereto. At high speeds, the speed of the turbine 24 approaches the speed of the pump 22. A clutch plate 60, diagrammatically shown in released 60 and connected 60' modes in FIG. 5, is connected to the input shaft 30. At a predetermined r.p.m., this plate 60 is fluid activated so as to "lock-up", i.e. mode 60', with the converter 20 housing for concurrent rotation therewith. Thus, a direct mechanical connection between the drive shaft 12 and the input shaft 30 is provided.

The output shaft 32 of the transmission is connected to a spline shaft 34, via coupling device 36, which is attached to a rotatable load 70. The load 70 simulates the rear axle load of the vehicle. Brakes 72 engage the load and are selectively engageable therewith by operation of brake handle 73 communicated therewith by cable (not shown).

Figure 3:
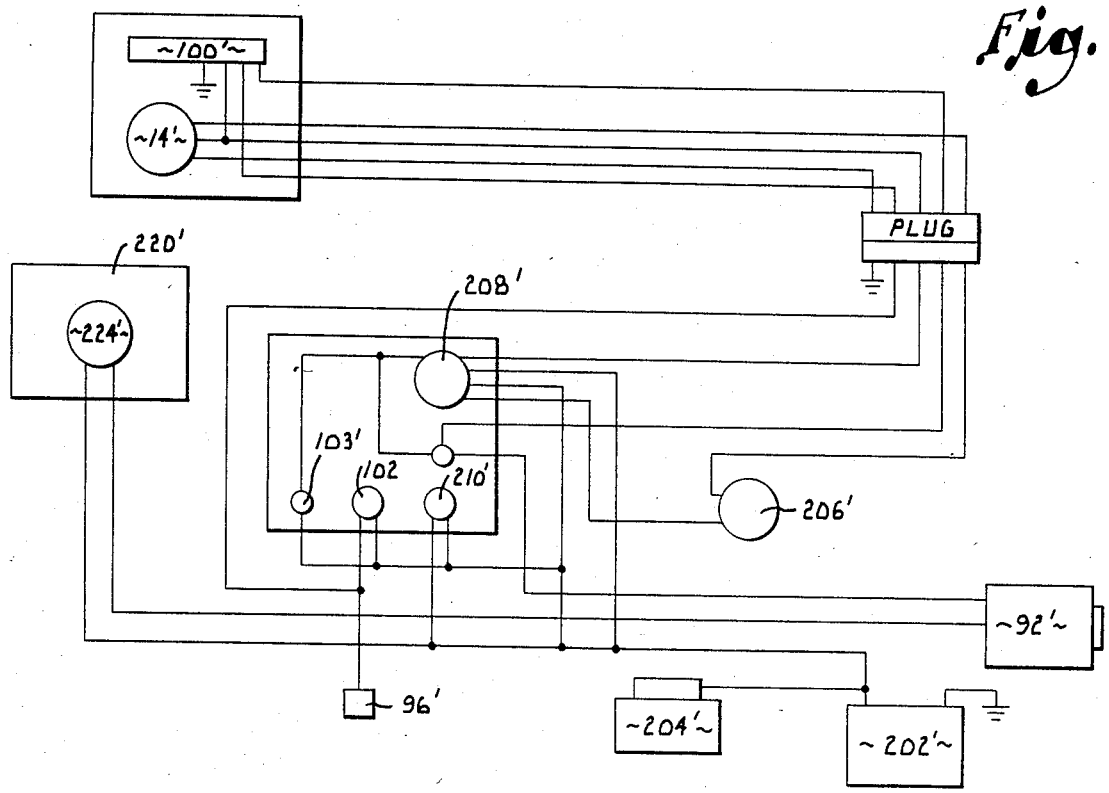
FIG. 3 is a diagram schematically illustrating the normal wiring of a basic front wheel transmission test machine and the apparatus for testing the lock-up mechanism.

Associated with the prime mover 10 are various gauges to monitor the normal operation of the engine such as temperature gauges, ammeter, etc. Throttle 12, operably communicated with the prime mover 10, allows the r.p.m.s of the prime mover to be regulated by the operator as measured by tachometer 14. It is also noted that the electrical system of the test machine, as illustrated in FIGS. 3 and 4, is powered by operation of the prime mover 10 and the associated alternator 92 as in a normal vehicle.

Figure 1:
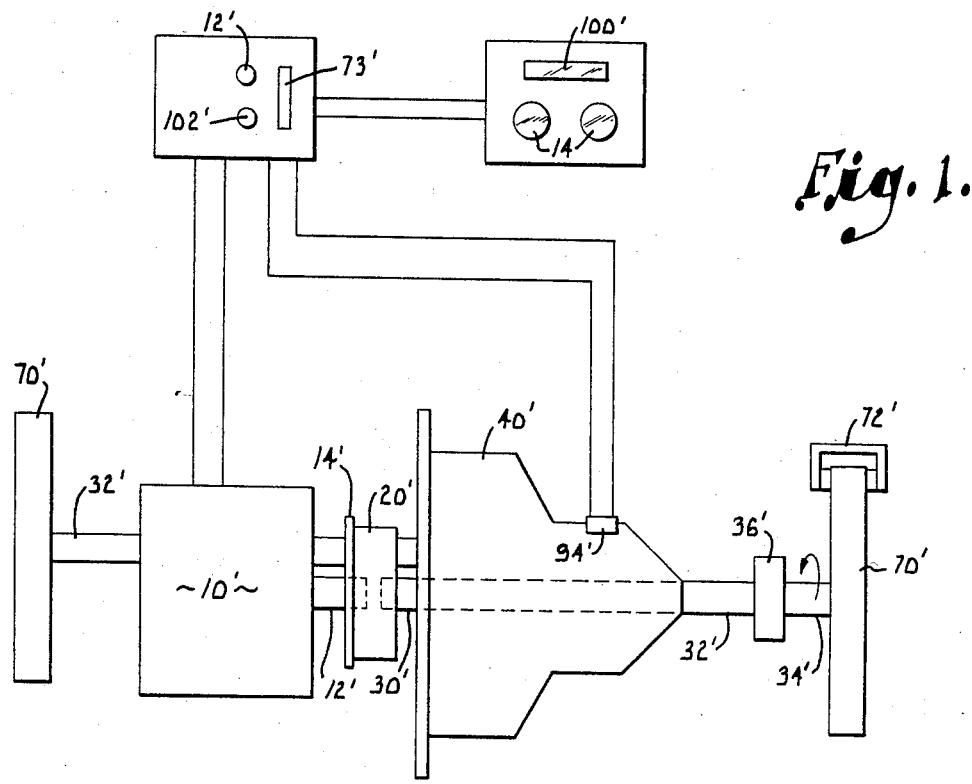
FIG. 1 is a block diagram of a front wheel transmission test machine with the apparatus for testing the lock-up mechanism being diagrammatically illustrated therein.

FIG. 2 illustrates the a rear wheel drive transmission test machine. In FIG. 1, a front wheel drive test machine is illustrated with like components being numbered with like primed numbers which function as described. Note that in FIG. 1, two loads 70' are illustrated which are analogous to the two driven axles of a front wheel driven vehicle. As such, two output shafts 32' are shown emanating from transmission 40, it being understood that the differential et al for the driven axle is contained in the housing of transmission 40'.

Figure 4:
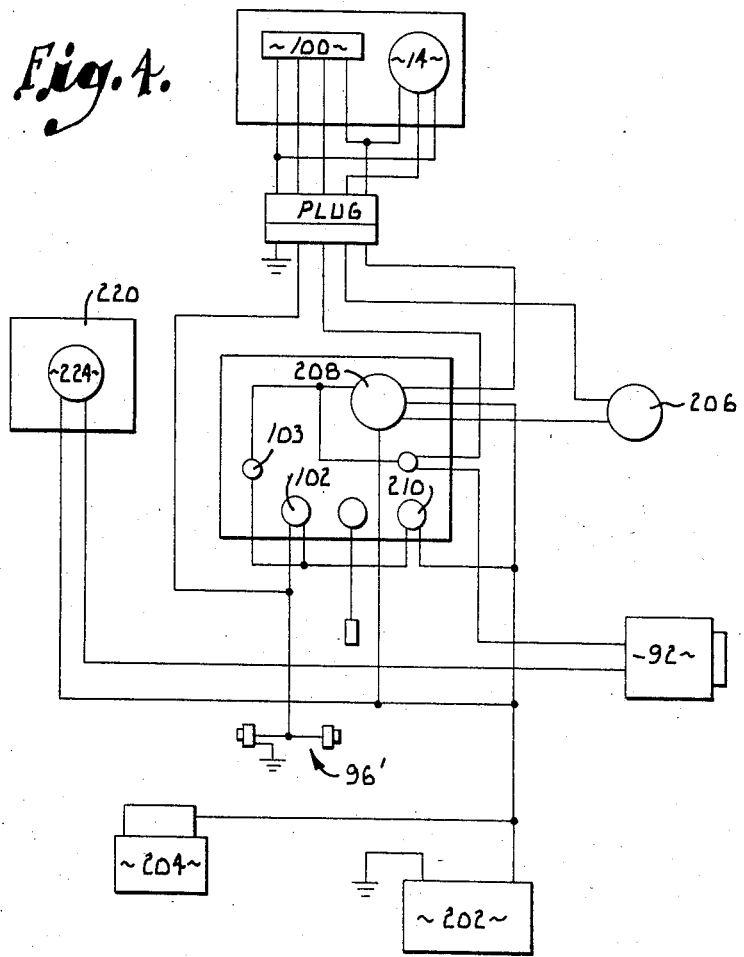
FIG. 4 is a diagram schematically illustrating the normal wiring of a rear wheel transmission testing machine and the wiring for the apparatus for testing the lock-up mechanism.

FIG. 4 illustrates the wiring diagram of the associated electrical system of the rear wheel test machine. Again, like components are numbered with like prime numbers in FIG. 3 and function as above described. As such, the starting system of the prime mover 10 includes the battery 202, starter 204, distributor 206, ignition switch 208, bump start switch 210 and alternator 92. A gauge panel 220 having various gauges thereon (ammeter 224 only shown) indicative of various parameters associated with operation of the prime mover 10 is shown.

In my invention, I utilize a digital clock 100 wired into the alternator 92 of the electrical system of the test machine. Clock 100 is energized by the electrical system, inclusive of alternator 92 as powered by operation of the prime mover 10. As shown in the wiring diagrams, a fused 103 lock-up switch 102 is wired to the clock 100 and lock-up solenoid 94 via plug 96. In normal vehicle operation the solenoid 94 is energized by current from the alternator 92 once a certain r.p.m. of the vehicle is sensed by factory-provided detection devices. Once energized, the solenoid 94 activates a clutch controlled fluid valve which directs oil to the apply side of the clutch plate 60 so that it engages the converter housing 20 as shown by phantom line position 60'. One method of engagement is shown in FIG. 5 in which the plate 60' bears against flanges 62 connected to the converter 20 housing. In my invention I utilize the factory-provided plug 96 to wire the lock-up switch 102 to solenoid 94. In this arrangement closure of switch 102 causes current, as produced by the electrical system/alternator 92 of the operating prime mover 10, to simultaneously flow to the lock-up solenoid 94 and clock 100.

In normal use, the rebuilt/repaired transmission 40 is mounted on the test machine. The drive shaft 12 of the prime mover 10 is then connected to the torque converter 20 and pump 22 with the input shaft 30 being connected to the turbine 24 and clutch plate 60. The output shaft 32 of the transmission 40 is then coupled 36 to the spline shaft 34. (Various fluid hoses extending from the transmission are connected to appropriate fluid sources so as to mirror the connection of the hoses as if on an actual vehicle.) Once mounted, the prime mover 10 is energized and the transmission connected thereto is shifted through the appropriate gears. Depending on the measuring devices, various data can be ascertained which is indicative of transmission operation.

In use of my invention, the standard governor is removed from the transmission 40 and is replaced with a governor blocked to simulate a high gear condition. The brake 72 of the test machine is applied to the load 70 which precludes rotation of the output 32 and spline 34 shafts. The throttle 12 is adjusted so as to rotate the drive shaft 12 at 1,000 r.p.m. The blocked governor causes the tested transmission to move into high gear resulting in an approximate 1:1 ratio between that of the input 30 and output 32 shafts. The lock-up test button 102 is depressed which causes an electrical signal/command to be simultaneously sent to the clock 100 and the lock-up solenoid 94 via plug 96. Thus solenoid 94 activates which initiates operation of the lock-up assembly. A valve-directed fluid flow causes the converter clutch plate 60 to engage the torque converter housing, as in 60' of FIG. 5, which causes concurrent rotation of the attached turbine/input shaft 30 with the converter 20 housing. As the converter 20 housing is connected to drive shaft 12, a direct drive is established among the drive shaft 12, the input shaft 30, output shaft 32 and spline shaft 34.

However, the application of brake 72 to load 70 precludes rotation of the spline 34 and output 32 shafts. Due to the direct drive among the shafts, this preclusion of rotation is rearwardly transferred to the drive shaft 12 of the prime mover 10. As the drive shaft 12 is unable to turn, the prime mover/engine will stall. (Note that prior to "lock-up", the inherent slippage of the fluid coupling between the drive 12 and input 30 shafts allows the drive shaft 12 to turn). Thus, the electrical system, inclusive of the alternator 92, no longer functions which reduces the output to zero. Thus, the current to the clock 100 is "cut off" which ceases its operation. A time indicia will appear thereon which is indicative of the elapsed time between the time the lock-up button 102 is depressed and the time the engine 10 stalls. This time corresponds to the time it takes the lock-up assembly of the torque converter 40 to "lock-up", i.e. establish the direct-drive connection, once it receives its command signal.

As a result of repeated tests of transmissions on vehicles and on the test machines, I have found that a time of 1.5 seconds for "lock-up" to take place is a time interval which is highly indicative of proper performance of the lock-up mechanism. Thus, a greater time interval, as measured on clock 100, is indicative of a malfunction in the lock-up assembly which can be magnified upon actual installation and use of the transmission on the vehicle. Accordingly, if the time on clock 100 is greater than 1.5 seconds, repair of the lock-up mechanism can be accomplished prior to installation of the transmission on the vehicle.

It is to be understood that my invention encompasses the apparatus and method of testing a lock-up mechanism on today's torque converter. Thus, the above specification and drawings enables one skilled in the art to apply my apparatus and tests to various transmission test machines. Accordingly, it is to be understood that while certain forms of this invention have been illustrated and described, it is not limited thereto, except in so far as such limitations are included in the following claims.

Having thus described the invention, what is claimed as new and desired to be secured by Letters Patent is:

1. A control system for testing the lock-up mechanism of a torque converter of a vehicle transmission mounted on a transmission test machine, said test machine including a functional prime mover as evidenced by rotation of a drive shaft powered by said prime mover and a current-producing electrical system energized by operation of said prime mover, said torque converter providing a fluid coupling of the drive shaft to an input shaft of said transmission under test, said lock-up mechanism including switch means for initiating operation of said lock-up mechanism for mechanically coupling said shafts, said test machine further including a simulated load connected to an output shaft of said transmission, said control system comprising:
   an electric clock;
   circuitry for directing current from said electrical system to said clock to operate the same;
   circuitry for delivering current from said electrical system to said lock-up mechanism switch means to initiate operation of said lock-up mechanism;
   switch means for simultaneously directing said current from said electrical system to said lock-up mechanism switch means and said clock;
   cutoff means for ceasing operation of said clock upon said coupling of said drive and input shafts by said lock-up mechanism;
   said clock presenting a time parameter thereon indicative of the time interval between the initiation of operation of said lock-up mechanism and said coupling, said parameter comparable to a predetermined time parameter corresponding to a desired time interval between initiation of operation of said lock-up mechanism and said coupling, said time parameters indicative of the relative quality of actual operation of said lock-up mechanism of said transmission under test.

2. The apparatus as claimed in claim 1 wherein said cutoff means comprises:
   brake means for precluding rotation of said output shaft and said prime mover drive shaft linked thereto, said preclusion ceasing operation of said prime mover upon said coupling of said drive and input shafts whereby to deenergize said current-producing electrical system and said clock powered thereby.

3. A method of measuring the time expended for a lock-up means of a torque converter of a vehicle transmission having input and output shafts to connect the drive shaft of a prime mover to said input shaft of said transmission comprising the steps of:
   providing a clock mechanism having time indicating means thereon;
   providing said prime mover with said drive shaft, said prime mover having associated current producing means activated upon operation of said prime mover for generating an electrical current;
   coupling said input shaft of said transmission with said drive shaft of said prime mover by means of said torque converter;
   providing a load;
   connecting said output shaft of said transmission to said load;
   operating said prime mover to rotate said drive shaft, said torque converter fluid coupling the rotation of said drive shaft in a manner to rotate said input shaft;
   rotating said drive shaft to a preselected r.p.m.;
   braking said load in a manner to preclude rotation of said output shaft;
   directing said current generated by said current producing means of said operating prime mover to said clock mechanism to begin operation of the same;
   simultaneously directing said current to said lock-up means to institute a simultaneous operation of the same;
   said lock-up means of said torque converter linking said drive shaft of said prime mover with said input shaft of said transmission and said braked output shaft of said transmission, said braked output shaft precluding rotation of said linked drive shaft whereby to stall operation of said prime mover and said current producing means, whereby to stop operation of said clock mechansim at a first elapsed time parameter indicated thereon; and
   comparing said time parameter on said clock to a predetermined time parameter indicative of a normal time lapse between initiation of operation of said lock-up means and said linkage between said drive shaft and input shaft, whereby said comparison indicates the relative quality of operation of said lock-up means.

4. A control system for testing a lock-up mechanism of a torque converter of a vehicle transmission having input and output shafts operated by rotation of a drive shaft of a powered prime mover, said torque converter providing a fluid coupling of the drive shaft to an input shaft of said transmission with said lock-up mechanism mechanically coupling said drive and input shafts, said control system comprising:
   a current-producing electrical system energized by operation of said prime mover;
   an electric clock;
   circuitry for simultaneously directing current from said electrical system to said clock and to said lock-up mechanism to simultaneously initiate operation of said clock and said lock-up mechanism;
   cutoff means for ceasing operation of said clock upon said lock-up mechanism coupling said drive shaft with said input shaft;
   said clock presenting a time parameter thereon indicative of the time interval between the initial delivery of current to said lock-up mechanism and said coupling, said parameter comparable to a predetermined time parameter corresponding to a desired time interval between initiation of operation of said lock-up mechanism and said coupling, said time parameters indicative of the relative qualtiy of actual operation of said lock-up mechanism of said transmission.

5. The apparatus as claimed in claim 4 wherein said cutoff means comprises:
   brake means for precluding rotation of said output shaft upon said coupling, said preclusion ceasing operation of said prime mover drive shaft, said associated prime mover, said current-producing system amd said clock powered thereby.

* * * * *